Sept. 1, 1959
E. A. KLINE ET AL
2,901,826
DENTAL CUTTING TOOL
Filed Jan. 31, 1957
2 Sheets-Sheet 1
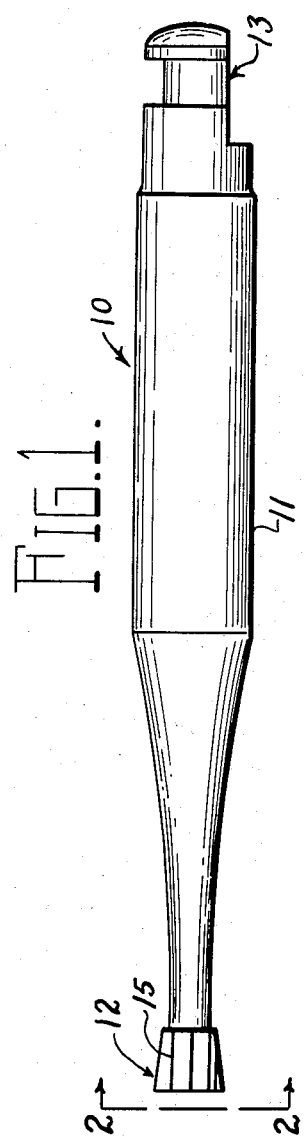
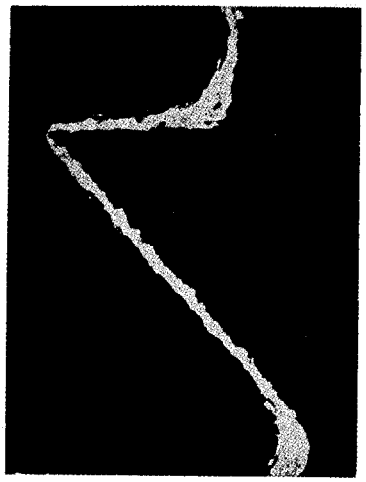
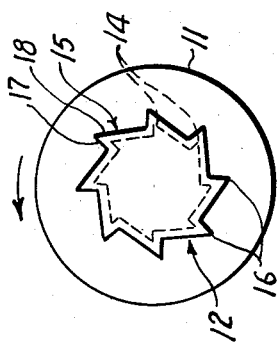
INVENTOR.
Edgar A. Kline
Ray E. Crouse
BY Robert F. Leu
ATTORNEYS

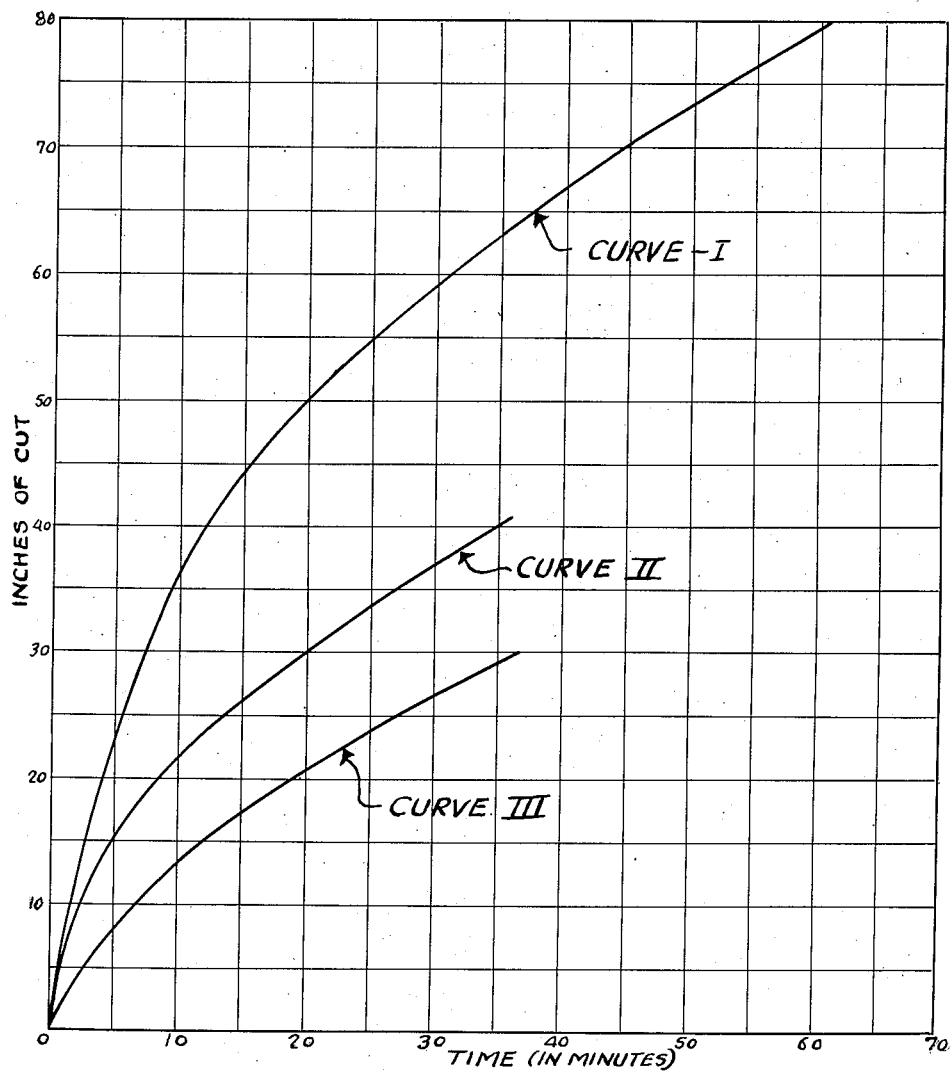

United States Patent Office 2,901,826
Patented Sept. 1, 1959

2,901,826

DENTAL CUTTING TOOL

Edgar A. Kline and Ray E. Crouse, Toledo, and Robert F. Leu, Delta, Ohio

Application January 31, 1957, Serial No. 637,509

2 Claims. (Cl. 32—48)

This invention relates to a dental cutting tool, and, more particularly, to such a tool which is a shaped metal base with a hard, thin, tough and resilient coating adhered thereto.

Various suggestions for dental cutting tools have heretofore been made. The most commonly used tools are steel burs having variously shaped teeth. Similar cutting tools composed of sintered tungsten carbide bodies, and others which are composed of an appropriate metal base with diamond particles embedded in a copper-nickel matrix which is adhered to the metal base, have also been suggested, and have been used to a relatively limited extent. Such tools, however, other than the steel or steel alloy burs, are more costly. They are, of necessity, quite small, and in addition, are comparatively fragile, so that they are both easily lost and easily broken. As a consequence, the steel burs are preferred by most dentists.

The present invention is based upon the discovery of a dental tool which is a metal base, such as steel or steel alloy with a hard thin coating thereon, and which tool is substantially superior to conventional steel dental burs.

It is therefore, an object of the invention to provide an improved dental cutting tool.

Other objects and advantages will be apparent from the description which follows, reference being had to the accompanying drawings, in which—

Fig. 1 is a plan view of a coated dental cutting tool according to the invention, which tool is, specifically, a bur;

Fig. 2 is an end view of the bur of Fig. 1;

Fig. 3 is a plot showing, as a function of time, the length of cuts, to uniform depths, made by various cutting tools according to the invention during the course of a carefully controlled test; and Fig. 4 is a photomicrograph showing, in section, a fragment of an actual bur according to the invention.

Referring now in more detail to the drawings, a dental bur (many times enlarged) indicated generally at 10 comprises a single shaped bur steel member comprising a shank portion 11 which tapers toward one end at which a cutting head indicated generally at 12 is provided. The opposite end of the shank 11 is appropriately shaped as indicated generally at 13 so that the bur can be engaged and driven by conventional apparatus used by dentists for this purpose. The cutting head 12 comprises a plurality of toothed members 14, and a hard, thin coating 15 adhered to the toothed members 14 as well as to other parts of the cutting head 12. The coating 15 may also extend onto the tapered part of the shank portion 11, adjacent the cutting head 12.

The coating 15 can be, for example, a hard carbide coating, and can be applied according to the method, and using the apparatus, disclosed in U.S. Patent 2,714,563, which produces a hard carbide coating having a lamellar structure. As a specific instance of such a coating, mention can be made of one produced from a starting material composed of tungsten, about 90 percent, cobalt, about 7 percent, and carbon, about 3 percent. The carbon in such starting material is usually present as tungsten carbides. The starting material is fed at a controlled rate into an appropriate chamber in which detonations are caused to occur by sparking detonatable mixtures of air or oxygen with hydrogen, acetylene, propane, or the like. A coating produced in this manner, by propulsion of the particles of the charge material, as a result of the detonation, against a base article to be coated, comprises about 7 percent of cobalt, 87 percent of various tungsten carbides (WC, $W_2C$, $W_xC_y$) and about 6 percent of tungsten.

The terms "percent" and "parts" are used herein and in the appended claims to refer to percent and parts by weight, unless otherwise indicated.

The coating identified above has been applied to the metal bur base shown in Figs. 1 and 2 of the drawings. The resulting coated metal bur according to the invention was found to be admirably suited for various types of dental drilling work. The coating, initially, had a rough exterior surface somewhat resembling fine emery cloth, which rough surface was effective for cutting both hard porcelain-like tooth enamel and relatively soft dentine. Extensive tests have indicated that the bur 10, carrying the identified coating, can be used effectively as a dental cutting tool for an average of about ten minutes of continuous drilling before the roughened exterior surface thereof loses its effectiveness for cutting. An ordinary uncoated dental bur, made of appropriated shaped bur steel, can be expected to have a useful life of less than one minute. Therefore, the cutting tool 10, coated as indicated, has an effective service life, by virtue of the abrasive nature of the coating, which is more than ten times the effective life of an uncoated dental bur.

It will be appreciated from the foregoing discussion that the toothed portions 14 of the dental cutting tool 10 are not essential for the production of a dental cutting tool which is many fold superior to dental drills made of bur steel which are presently in general use. The dental cutting tool could be provided merely with a head portion which is circular in cross-section, and the indicated coating could be applied to such head portion. In fact, such structures have been produced, and tested, and it has been found that the gritty coating exterior enables such a cutting tool to operate effectively under conditions simulating those encountered in dental drilling work for approximately ten minutes. For reasons which will subsequently be discussed in detail, however, an unexpectedly superior cutting tool in accordance with the invention is one wherein the coating is applied to a metal base which is so shaped as to have definite toothed portions, and wherein the coating, measured at a point below, or radially inwardly from, the tip of the cutting teeth, and along the cutting edge thereof, has a thickness of from about 0.0004 to about 0.001 inch.

Referring again to the drawings, and particularly to Fig. 2, the bur 10 is designed to be rotated in the direction indicated by the arrow. After the initial period of operation of the bur, which initial period, as above indicated, is approximately ten minutes of continuous drilling, and during which time the cutting action is essentially as a consequence of the abrasive nature of the coating 15, the coating has been found, by microscopic examination of the bur, to be worn completely away from tips 16 of the toothed portions 14. Therefore, as use of the bur is continued, after the initial abrasive drilling use, tooth enamel or dentine being cut is contacted first by a portion 17 of the coating 15 which is traveling generally across, and normal to the surface being cut, then by some of the base metal in a part of one of the toothed portions 14, and finally by a forwardly slanting portion 18 of the coating 15. It has been found that the coated bur 10 according to the invention is self-sharpening after the initial abrasive drilling period. While the bur is being used, during the self-sharpening portion of its useful life, when the coating is of the indicated or an equivalent composition, and is not thicker than about 0.001 inch, both the sloping coating surface 18 and the base metal from each of the toothed portions 14 are worn away at a rate faster than that at which the generally normal portion 17 of the coating is worn away. Therefore, the surface 17 is the effective cutting surface on each of the toothed portions, and continues to be an effective cutting surface for an extended period of time after portions of the coating surface are worn away. As a practical matter it is usually preferred that the coating 15 be at least 0.0004 inch thick, as uniform, continuous coatings of lesser thickness are difficult to achieve.

The efficiency of a dental cutting tool at various times during its useful life can be evaluated by using the tool to make a cut under controlled conditions, either in actual cutting of tooth material, enamel and dentine, or in cutting a material which behaves similarly. It has been found that a hard board material made under pressure from Portland cement and asbestos fibers, which board is commercially available under the trade name "Transite," simulates quite closely the actual tooth material which it is desired to cut with a dental tool, so that such a test conducted using the "Transite" material provides a reliable measure of the efficacy of the cutting tool in actual service use. A reliable test of the efficiency of a particular dental cutting tool, therefore, involves making a cut in the "Transite" board, under controlled conditions, measuring the length of the cut made by the tool under those conditions after various times, and plotting the length of cut made as a function of time. The slope of such curve at any given point on the resulting plot is a measure of the cutting efficiency of that tool after the time of cutting indicated by the point.

Fig. 3 is a plot of length of cut in inches against time in minutes for several different hard carbide coated cutting tools all having the shape of the tool 10 shown in Figs. 1 and 2, and differing from one another only in coating thickness. The particular tests represented in Fig. 3 were conducted by making a cut 0.030 inch deep in a sheet of "Transite" board, by rotating each of the tools at 20,000 revolutions per minute, while applying an intermittent force of 16 ounces transversely of the cutting heads of the tools to bring them into cutting engagement with the "Transite" board. Curve I of Fig. 3 is a plot for a bur carrying the above-identified coating in a thickness of 0.0005 inch; curve II is a similar plot for a bur carrying the coating 0.001 inch in thickness; and curve III is such a plot for a bur carrying the coating in a thickness of 0.005 inch. It will be observed that, initially, curves I and II are almost straight lines of steep positive slope, that the slope decreases slightly after a few minutes of cutting, that the slope of the curve then declines at a somewhat more rapid rate, and finally becomes again approximately constant, so that the terminal portion of each of the curves is nearly a straight line. The changes in slope of these curves indicate that the drills are most effective, or cut fastest, when new, and while the previously discussed abrasive surface exists on the exterior of the coating. As this abrasive surface is worn away, the burs cut somewhat more slowly, and the rate of cutting continues to decrease until the abrasive nature of the coating has been eliminated and the coating on the tips of the toothed portions 14 has been worn completely away. At this point in the use of such a bur, the previously discussed self-sharpening characteristic becomes important; the mechanism responsible for cutting of the bur changes, and, by virtue of the self-sharpening feature, cutting continues for an extended period of time at a substantially constant rate. It will also be observed that the cutting action of the bur represented by curve III is substantially slower at all times during the test than that of either of the other two burs, and that the cutting rate (slope) decreases considerably more rapidly than does that of either of the other two burs. The reasons for this phenomenon are not fully understood, but it is clear from these curves that coating thickness is critical for burs according to the invention, and that optimum efficiency is achieved by applying the coating in a thickness ranging from about 0.0004 to about 0.001 inch.

It will be appreciated that various bur shapes other than that represented in Figs. 1 and 2 can be coated to produce dental cutting tools according to the invention. For example, any shape that is conventionally used as a steel bur can advantageously be so coated. In addition, merely a coated cutting head which is circular in cross-section, triangular, rectangular, or of other polygonal cross-section, so coated, can be used. Furthermore, a bur provided with a cutting head which is circular in cross-section and knurled to provide toothed portions is also suitable. As has been indicated above, cutting head shapes which provide defined teeth or toothed portions are preferred. The reason for such preference will be apparent from the foregoing discussion of the self-sharpening characteristic of the tool 10. It has been found to be generally true that a cutting tool according to the invention which has well defined teeth exhibits such self-sharpening characteristic, provided that the coating thickness, measured perpendicular to the tooth face at the point of measurement, is within the above-indicated range. Coating thickness must be measured at a point on a toothed portion which is radially inward from the outer extremities of the cutting head, but radially outward from the roots, if any, of the teeth, or otherwise stated, at some intermediate point along a tooth edge. Coating thickness is measured at such a point because the relatively sharp radial extremities of teeth receive a substantially thinner coating than do intermediate parts of the teeth, while a substantially thicker coating is built up in the roots between the teeth. This phenomenon can be observed in Fig. 4, which is a photomicrograph, enlarged approximately 200 times, of a section through a coated dental bur according to the invention. One of the toothed portions 14 and the coating 15 thereon (see Fig. 2) can be seen in the photomicrograph of Fig. 4. Coating thickness of the burs used in conducting tests represented by the three curves of Fig. 3 was measured from photomicrographs similar to Fig. 4, and at an intermediate point on the cutting edges of the teeth, which point, specifically, was at the intersection of the teeth with an imaginary circle which was concentric with, and had nine-tenths the diameter of, a circle circumscribed about the outer extremities of the teeth.

It will also be appreciated that various hard and refractory coatings other than that specifically disclosed above can be used to produce dental burs according to the invention. A specific instance of another such coating is one produced in the previously described manner where the composition applied is composed of 85 percent of chromium carbide and 15 percent of nickel. Various other coatings can also be used to produce dental cutting tools which are superior to the commonly used steel burs. In general, to be suitable for use as a coating on a dental cutting tool, a composition must be hard, refractory and abrasion resistant; it must be sufficiently tough and resilient that it is not chipped from the metal base under service conditions; and it must adhere sufficiently tightly to the base that it remains thereon as a coating during service use. The best results have been obtained with lamellar coatings, the form in which carbide coatings such as the two identified above have been deposited on the burs. It is preferred that the coating be sufficiently homogeneous that it appears to be a unitary structure when examined even under several power magnification, although it can contain relatively small hard particles, which may be carbide particles in either of the specifically identified compositions.

The coating must be thin, and, ideally, have a thickness of from about 0.0004 to about 0.001 inch. The coating can be applied to the base in any desired manner which does not alter desired properties of, or deteriorate, the base. Application of the coating, as discussed above, and as disclosed in U.S. Patent 2,714,563, constitutes an excellent method for producing a dental cutting tool according to the invention, as the base is not heated to an elevated temperature when such method is used. For example, it has been found to be feasible to maintain a shaped base of bur steel at a temperature not higher than about 400° F. during application of a coating by this method. Such temperature does not alter the metallurgical characteristics of the bur steel to any significant degree, or cause deterioration thereof. Various hard tool steels with hard carbide coatings thereon constitute preferred dental cutting tools in accordance with the invention.

The term "hard," as used herein and in the appended claims to define coatings on dental cutting tools, refers to coatings having a hardness, as indicated by a Diamond Pyramid Hardness Number, Vickers, of at least 1050.

Various other changes and modifications can be made from the specific details disclosed herein and shown in the attached drawings without departing from the spirit and scope of the appended claims.

What we claim is:

1. A dental cutting tool comprising an appropriately shaped tool steel base shaped to define cutting teeth and a thin, substantially homogeneous, tough and resilient, hard, refractory carbide coating tightly adhered to said metal base, said coating having a thickness, measured at an intermediate point along an edge of said teeth, of from about 0.0004" to about 0.001".

2. A dental cutting tool as claimed in claim 1 wherein the coating has a lamellar structure.

References Cited in the file of this patent
UNITED STATES PATENTS

| | | |
|---|---|---|
| 2,562,587 | Swearingen | July 31, 1951 |
| 2,626,221 | Elliott | Jan. 20, 1953 |
| 2,714,563 | Poorman et al. | Aug. 2, 1955 |